Dec. 12, 1944.   L. D. MILLS ET AL   2,364,867
CYANIDATION METHOD AND APPARATUS
Filed July 30, 1940   2 Sheets-Sheet 1
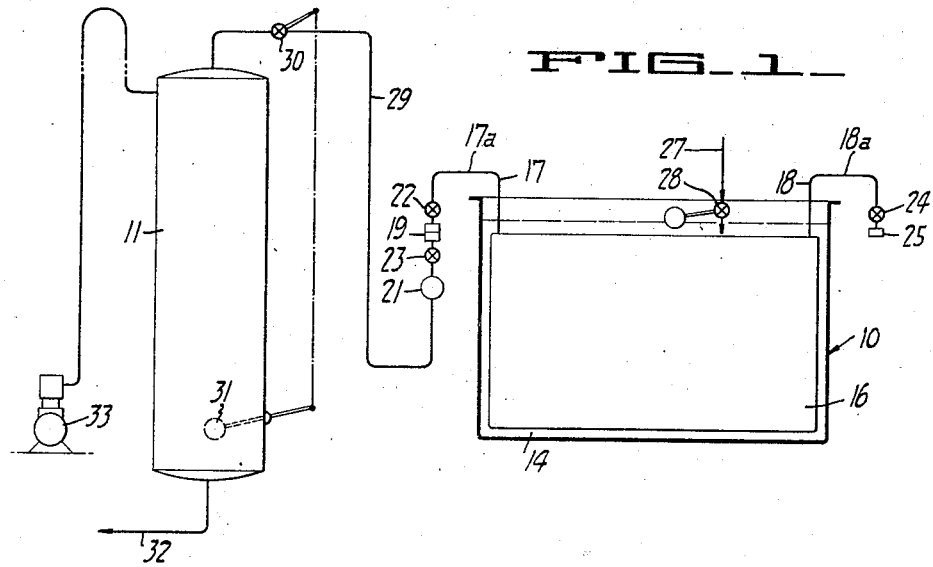
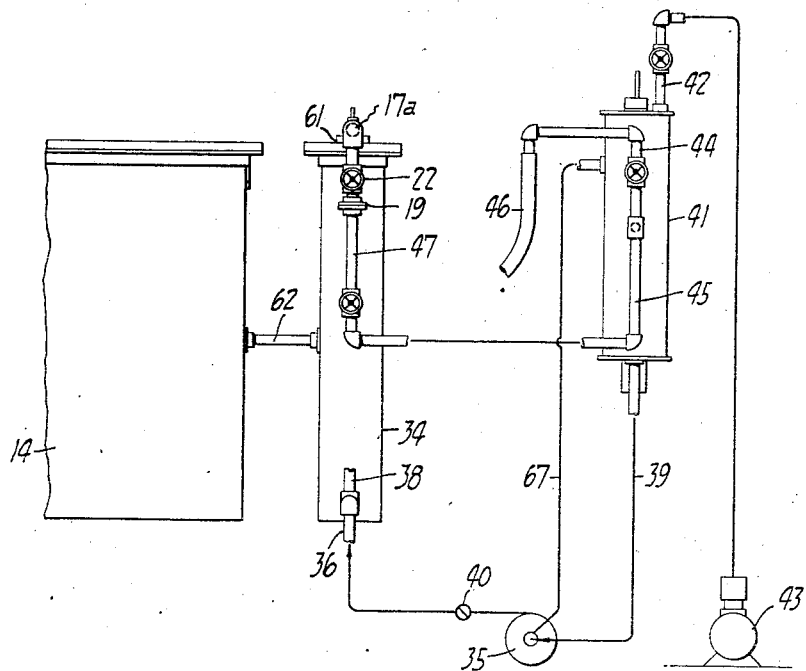
INVENTORS
Louis D. Mills
Thomas B. Crowe
Raymond E. Byler
BY
ATTORNEY

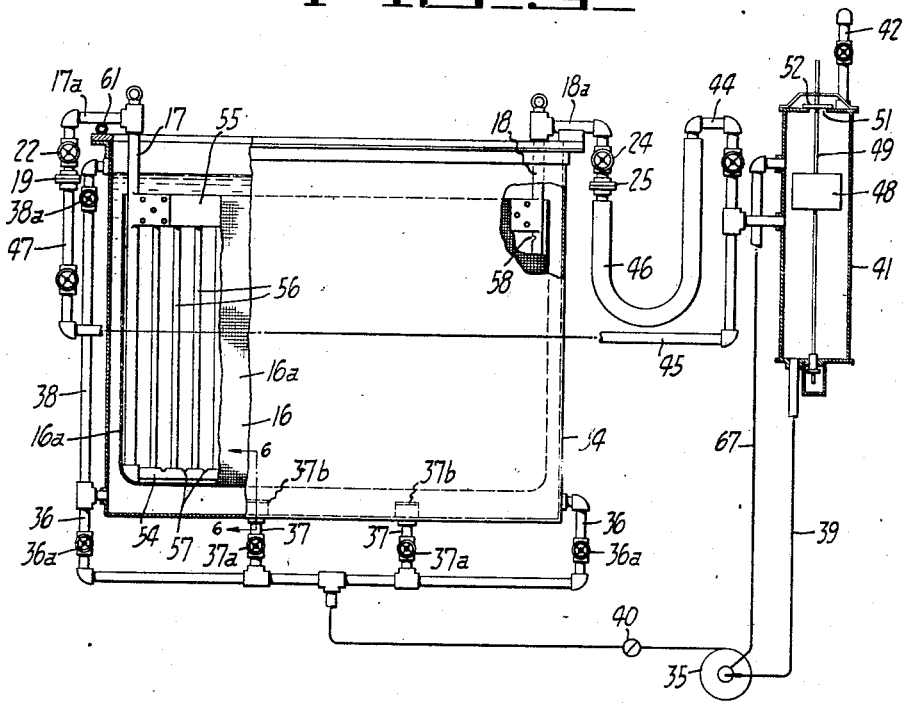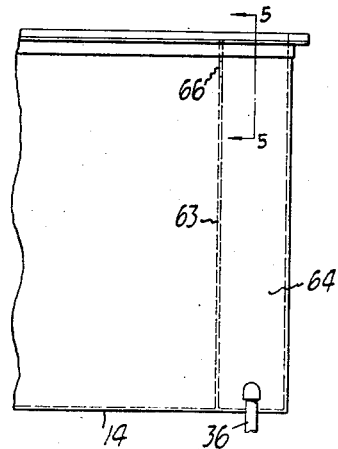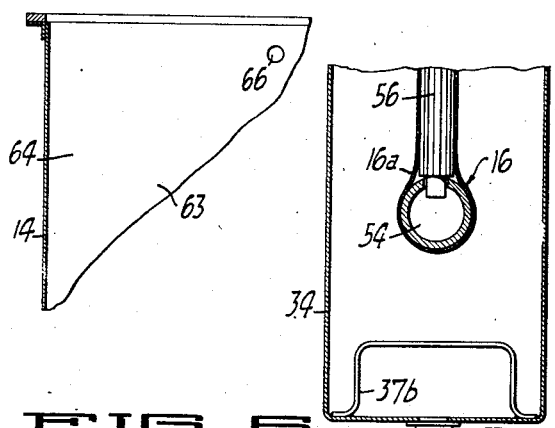

Patented Dec. 12, 1944

2,364,867

UNITED STATES PATENT OFFICE 2,364,867

CYANIDATION METHOD AND APPARATUS

Louis D. Mills and Thomas B. Crowe, Palo Alto, and Raymond E. Byler, Stanford University, Calif., assignors to The Merrill Company, San Francisco, Calif., a corporation of California Application July 30, 1940, Serial No. 348,378

3 Claims. (Cl. 210—153)

This invention relates generally to methods and apparatus for clarifying liquids, as for example pregnant cyanide solutions used in the treatment of gold-silver ores. More specifically, it relates to methods and apparatus of the type wherein a submerged vacuum leaf filter is utilized for the purpose of clarifying the solution immediately prior to deaeration and precipitation.

In cyanidation systems utilizing continuous clarification of the cyanide solution followed by deaeration and precipitation of the same, it has been proposed to condition or precoat the filter cloth of the individual leaves of the clarifying filter following removal of filter cake from the same, and before the leaf has been reconnected with the filter effluent manifold, in order to insure proper filtration of the solution. This conditioning operation has been carried out by continuously circulating the cyanide solution through a filter leaf while it is detached from the effluent manifold, until the filtrate attains proper clarity, after which the leaf is connected for normal operation. While one may depend upon ore solids of the solution for conditioning the surface of the filter cloth, it is preferable to make use of a filter aid such as diatomaceous silica to form a precoat.

The economical use of such methods and the advantages to be gained by applying a precoat are dependent to a substantial degree upon the uniformity or lack of uniformity of the applied coating. In general, lack of uniformity of the precoat makes for increased consumption of the filter aid and requires an undue extension of the precoat period for the purpose of insuring coating of all the surfaces of the filter cloth. Where a certain minimum coating is not provided for certain areas or patches of the filter cloth, the slime accumulated during a normal filtering operation will not wash off readily, and the precoat may not function properly to insure a sparkling filtrate. Also, slime penetrates into the pores of the filter cloth and, by choking the pores, reduces the useful life of the cloth. In addition, where a filter aid like diatomaceous silica is being employed, contamination of the precoat with slime solids interferes with its effectiveness, as by increasing the resistance to flow of solution and by interfering with washing off the filter cake.

An object of the present invention is to provide a method and apparatus which will produce a precoat upon the filter leaves of optimum uniformity, thereby avoiding a coating of undue thickness upon certain areas of the filter membrane, or areas insufficiently coated with the filter aid. In attaining this object, the invention is characterized by application of suction to the two laterally spaced ends of a filter leaf, during the conditioning or precoating operation, thereby insuring substantially the same flow rate through all of the various portions of the filter cloth while the precoat is being applied.

Another object of the invention is to introduce the clarified solution into the bottom of the precoat compartment in such a way as to promote uniform suspension of the precoating material.

Another object of the invention is to insure a precoat of a filter aid like diatomaceous earth without substantial contamination with slime solids such as are ordinarily present in unclarified cyanide solution. In general, this is accomplished by means whereby during a precoat operation, at which time the leaf is within a precoat tank or compartment, effluent or clarified solution is withdrawn from the leaf and is returned to the bottom of the same compartment. When the leaf is transposed into operating position in the filter tank, effluent or clarified solution is also withdrawn from the leaf and is returned to the bottom of the precoat compartment, with a small portion being returned to the top of the precoat compartment for visual inspection, to insure clarity before connecting the leaf to deliver effluent into the normal suction manifold of the filter.

Further objects of the invention will appear from the following description in which the preferred embodiment has been set forth in detail in conjunction with the accompanying drawings.

Referring to the drawings:

Fig. 1 is a diagrammatic view illustrating a vacuum leaf clarifying filter connected with a solution deaerating receiver;

Fig. 2 is a diagrammatic elevation illustrating apparatus incorporating the present invention, including a separate precoat container or compartment into which a filter leaf is transferred during a precoating operation;

Fig. 3 is a diagrammatic view showing the same apparatus as Figs. 1 and 2, but looking toward one side of the precoat compartment, with a portion of the tank cut away to show details of the leaf construction;

Fig. 4 is a detail illustrating a modification in which the precoat compartment is integral with the clarifying tank;

Fig. 5 is a fragmentary detail taken along the line 5—5 of Fig. 4;

Fig. 6 is an enlarged cross sectional detail taken along the line 6—6 of Fig. 3.

The apparatus illustrated in Fig. 1 of the drawings includes generally the solution clarifying filter 10 and a deaerating receiver 11. As is well known by those familiar with cyanidation equipment, settled but unclarified cyanide solution having dissolved precious metal values is supplied to the tank of the clarifying filter 10, and after being clarified, the effluent flows through the evacuating receiver 11 where dissolved air is removed. This solution then flows from the deaerating receiver to suitable precipitating apparatus, which may include means for introducing a precipitant like zinc dust into the solution, and a suitable precipitating filter.

The clarifying filter 10 is of the vacuum leaf type and consists of a solution tank 14 in which a plurality of leaves 16 are disposed. Each filter leaf is provided with a pair of riser pipes 17 and 18, which communicate with the two laterally spaced ends of the filter leaf, and which have lateral extensions 17a and 18a. Extension 17a is provided with a coupling 19 for making detachable connection with the effluent manifold 21, and also with a stop cock 22. Between the coupling 19 and manifold 21, there is the usual valve 23. The extension 18a on riser pipe 18 is provided with a valve 24 and coupling means 25.

Solution is introduced into the main compartment of tank 14 by the solution line 27, which can be controlled by float valve 28. Flow line 29 serves to connect the effluent manifold 21 with the upper portion of the deaerating receiver 11. This line is shown being controlled by the valve 30, which in turn is controlled by a float 31 in the deaerating receiver. Clarified and deaerated solution is removed from receiver 11 by pipe 32, which can connect to the suction side of suitable pumping apparatus. The receiver 11 is evacuated by pump 33. When a filter leaf is in operation, valve 24 is closed, and valves 22 and 23 are open, so that the effluent passes directly through line 29 to the deaerating receiver.

For carrying out the precoating or conditioning operation on an individual leaf, it is desirable to make use of a separate precoat container or compartment 34, which is shown disposed at the same level as the filter tank. Suction means is utilized in conjunction with the container 34, and includes a pump 35 having its discharge side connected to the pipes 36 which deliver solution into the lower corners of the precoat container, and also pipes 37 which deliver solution through the bottom of the container. These pipes are shown being controlled by valves 36a and 37a. An auxiliary pipe 38, controlled by cock 38a and connected to one of the pipes 36, discharges into the upper portion of the precoating compartment above the solution level to enable visual inspection of the solution as it is being discharged. A check valve 40 is provided in the discharge from pump 35 to prevent backflow through the pump and into the separator 41. This separator is a small tank or chamber in which solution flowing into the same from a filter leaf separates out from any air which may be withdrawn from the leaf at the same time, with the solution being returned to the pump 35, as will be presently explained.

Above and opposite the entrance of pipes 36 into the bottom of the compartment 34, are the deflectors or baffles 37b which serve to deflect solution flow in a lateral direction, and thus prevent direct impingement of liquid discharged from pipes 37 upon the lower edge portion of the leaf.

In conjunction with the precoat compartment, attachments are provided for connecting both couplings 19 and 25 to the suction side of the pump 35, and in conjunction with these attachments, means is provided for insuring continued application of suction to the leaf while it is only partly immersed or entirely out of the solution. This means is substantially as disclosed in Mills and Crowe patent No. 2,261,399. Thus, pipe 39 connects the intake side of pump 35 with the lower end of the separator 41. Pipe 42 connects with the upper part of separator 41, and leads to suitable evacuating means such as an exhaust pump 43. Suction pipes 44 and 45 also communicate with separator 41. Pipe 44 is provided with a flexible hose section 46 for attachment to the coupling 25 of a filter leaf. Pipe 45 is provided with a vertical pipe section 47 for attachment with coupling 19 of the leaf.

The interior of separator 41 is provided with a float 48 carried by the vertically movable valve rod 49. The upper end of rod 49 extends through a vent 51 in separator 41, and is provided with a valve closure 52 whereby when solution within the separator and received from pump 35 rises above a given level the float 48 opens closure 52 to permit air to be drawn in from the atmosphere, thus reducing the vacuum within the separator. During intervals when the leaf is only partly immersed, air is drawn into the leaf together with solution and is discharged into the separator 41, from which it is withdrawn through suction pipe 42.

Each of the filter leaves 16 includes generally a frame enclosed by the filter cloth 16a. The lower edge of this frame is formed by the horizontal pipe 54, which connects with the lower ends of the riser pipes 17 and 18. The top horizontal member or header 55 connects the upper portions of the riser pipes 17 and 18, and the spacers or splines 56 extend between the lower pipe 54 and the header 55. Pipe 54 is provided with effluent openings 57, and riser pipe 18 is provided with an opening 58 which serves as an air vent, and which is located immediately below the header 55.

A filter leaf is attached to pipe 47 only during the precoating operation and while the leaf is within the precoating compartment. On the other hand, a leaf is attached to the flexible hose 46 during the precoating operation, and also during lifting and transfer of the leaf back to operating position in the main filter tank, and while circulating solution through the leaf in the main filter tank. For this reason, hose 46 should be of sufficient length and flexibility to permit attachment and use in all such operating positions.

To facilitate operation of the coupling 19, whereby the leaf is connected to the fixed pipe 47 during the precoating operation, the upper edge of the precoat compartment is shown provided with a resilient compressible member 61, which may be a short length of rubber hose of suitable dimensions. At the other end of the precoat compartment the leaf may be supported in any desired manner, as by means of having the pipe extension 18a rest within a shallow notch or groove formed in the upper edge of the precoat compartment.

In Fig. 2 the precoat compartment 34 is shown connected to the main filter tank 14 by the pipe connection 62. When the filter leaf connected to pump 35 is in the main filter tank, and the pump is in operation, solution discharged by pump 35 into the precoat compartment 34, flows through pipe 62 back to the main filter tank. It will be evident that because of the connections with the main tank, the solution in the precoat tank 34 and which is circulated through the filter leaf during the precoat operation, is the same as the cyanide solution being handled in the main tank.

Figs. 4 and 5 illustrate a modification in which the precoat compartment is an integral part of the main filter tank. In this instance a partition 63 is disposed near one end of the main filter tank to form a separate precoat compartment 64, corresponding to the compartment 34 of Figs. 1 to 3 inclusive. An overflow opening 66 in partition 63 corresponds to the flow pipe 62 of Fig. 2.

In order to make certain that the pump 35 is properly primed at all times, a pipe 67 can be provided as shown in Fig. 2, with one end of this pipe connecting to the pump housing adjacent the inlet opening of the same, and the other end connecting to the upper part of the separator 41. Any air which may be trapped in pipe 39 near the pump 35, or in the inlet passage of this pump, is free to vent through pipe 67.

Use of the apparatus described above and the carrying out of the present method can be explained as follows: When a considerable layer of slime has accumulated upon a filter leaf (with the parts as shown in Fig. 1), making it desirable to recondition a leaf for further use, the corresponding valve 23 is closed, and coupling 19 disconnected. If the accumulated filter cake is of such a character and the filter so constructed that the leaf can be raised without disturbing the cake, or without injuring the filter leaf, it is immediately removed from the main filter tank as is now conventional practice. However, in instances where the filter membrane tends to bag near the lower end of the leaf while being removed, thus disturbing and causing possible sloughing off of the slime cake, it is desirable to first connect hose 46 with the coupling 25, and start pump 35 in operation (with valve 24 open and valve 22 closed), whereby suction is placed upon the interior of the leaf while it is being raised from the filter tank. Such application of suction scavenges the interior of the leaf of solution and consequently prevents sagging of the lower portion of the leaf with resulting sloughing off of filter cake or possible injury to the filter cloth. The accumulated filter cake is now washed from the surface of the leaf as by methods now in practice on filters of this character. A proper quantity of filter aid such as diatomaceous silica is added to the solution in the precoat container 34, and the clean filter leaf is now transferred to this container, as illustrated in Figs. 2 and 3. The operator now connects the pipe 47 with the coupling 19, and with valves 36a and 37a open and valve 38a closed, the pump 35 is started in operation.

Discharge of circulated solution through pipes 36 and 37 into the lower corners of the precoat container causes sufficient agitation within the container to maintain the filter aid in proper suspension. Without the baffles or deflectors 37b, solution discharging from the pipes 37 would tend to wash away filter aid from adjacent areas of the filter leaf, but with these deflectors there is no direct impingement upon the lower edge portion of the leaf.

As filtrate is withdrawn through both of the riser pipes 17 and 18, a coating of the filter aid rapidly accumulates upon all of the surfaces of the filter cloth, and the thickness of the coating is relatively uniform for all areas. Uniformity of the coating is enhanced by application of equal suction to both the riser pipes 17 and 18, since it has been found that application of suction to only one riser pipe tends to cause application of a thicker coating of the filter aid in regions near that end of the filter leaf. Reintroduction of effluent through the pipes 37 assists in keeping the filter aid uniformly suspended, and also contributes to production of uniform coating of the filter aid. Without the baffles 37b, portions of the filter directly above pipes 37 would not receive a proper application of filter aid, due to impingement of solution jetting from these pipes. Baffles 37b prevent such impingement, without however detracting from maintenance of filter aid in proper suspension.

With respect to the operation of pump 35, it is desirable that this pump and its connected piping and hose have such a capacity that no column of solution is permitted to accumulate above the perforated pipe 54. This serves to avoid variations in pressure differential across the filter membrane for different heights such as would exist if a column of filtrate were maintained above pipe 54.

Within a comparatively short period of time, the application of filter aid is completed, and this is made evident by a clearing of the solution in the precoat compartment. The operator now transfers the conditioned filter leaf back into the main filter tank. It is desirable during this operation to maintain suction upon the leaf, and therefore the operator closes valve 22 before pipe 47 is uncoupled, but maintains the connection with hose section 46 while the leaf is being transferred to and lowered into the main filter tank. After being lowered into normal operating positions, and assuming that pump 35 remains in operation, the operator inspects effluent discharged from pipe 38 by opening valve 38a, and when this effluent is of proper clarity, coupling 19 is connected to the effluent manifold 21; valves 22 and 23 are opened; and then valve 24 is closed; and coupling 25 is disconnected from the hose section 46. The filter leaf has now been returned to normal operation. It will be evident that effluent from pipe 38 under such conditions is a part of the discharge from pump 35 and therefore is a part of the effluent being withdrawn from the filter leaf.

It will be apparent that since the method and apparatus described above makes possible the uniform application of filter aid, the thickness of the coating can be maintained at a minimum, consistent with the results desired. Therefore, all wasteful consumption of filter aid is avoided. In addition, the time required for application of the precoat is reduced to a minimum, and the danger of having areas or patches of the leaf improperly coated with the filter aid is entirely obviated.

A further feature of the invention is that there are substantially no slime solids in the solution during a precoat operation, and therefore the coating of filter aid is not appreciably contaminated with slime solids such as are ordinarily found in unclarified cyanide solution. Any solution flow through the pipe connection 62 of Fig. 2, or the openings 66 of Figs. 4 and 5, is normally from the precoat compartment into the main filter tank, and only at rare intervals is there a slight back flow of solution from the main tank back to the precoat compartment to equalize solution levels.

Check valve 40 prevents any back flow of filter aid and solution from the precoat compartment through pump 35 and into the separator 41, should pump 35 stop while appreciable amounts of filter aid remain in the precoat compartment. Should filter aid enter separator 41, it would interfere with subsequent inspection of the effluent to determine proper clarity.

We claim:

1. A method for the conditioning of the individual filter leaves of a vacuum filter employed for the clarification of cyanide solution, where during a normal filtering period the leaves are connected to a common effluent line to deliver filtrate to an evacuated deaerating receiver, the steps of disconnecting an individual filter leaf from the effluent line and lifting the same from the filter tank, removing accumulated slime from the leaf, introducing the leaf into a separate precoat container in which there is cyanide solution together with a filter aid in suspension, applying suction to both of the two laterally spaced ends of the leaf for a period of time sufficient to cause the filter aid to coat the filter membrane, discontinuing application of suction to one end of the leaf and then transferring the leaf back to the main filter tank while application of suction is continued to the other end of the leaf until the effluent attains proper clarity, and then reestablishing communication between the one end of the leaf and the common effluent line and interrupting application of suction to said other end of the filter leaf.

2. In apparatus for conditioning vacuum filter leaves used in the clarification of cyanide solution preparatory to deaerating and precipitating the same, a filter tank, a plurality of vacuum filter leaves suspended within said tank, each leaf having two separate pipes connecting to the laterally spaced ends of the leaf, each pipe having a valve and a coupling means for making connection with external suction means, a separate precoat compartment into which a leaf can be introduced, said compartment being adapted to contain solution together with a filter aid, means for applying suction to one of the pipes of a filter leaf when the leaf is in normal position within the filter tank and for applying suction to both said pipes when said leaf is removed from the filter tank and within the precoat compartment.

3. In apparatus of the character described for conditioning vacuum filter leaves used in the clarification of cyanide solution preparatory to deaerating and precipitating the same, a filter tank, a vacuum effluent manifold, a plurality of filter leaves in the filter tank, dual couplings and valves on each leaf permitting detachable connection and interruption of flow from the two laterally spaced ends of the leaf to either of two separate outlets, one of the outlets being adapted for connection to the manifold, a separate precoat compartment or container, the compartment being adapted to contain solution together with a filter aid, pumping means, a flexible hose for connecting the intake of the pumping means to one of the outlets of the filter leaf, whereby suction can be applied to a filter leaf while being transferred between the filter tank and the precoat compartment, and an additional pipe connection from the intake of the pumping means to the other outlet of the filter leaf whereby suction can be applied separately to the two laterally spaced ends of the filter leaf while within the precoat compartment.

LOUIS D. MILLS.
THOMAS B. CROWE.
RAYMOND E. BYLER.